Patented July 21, 1953

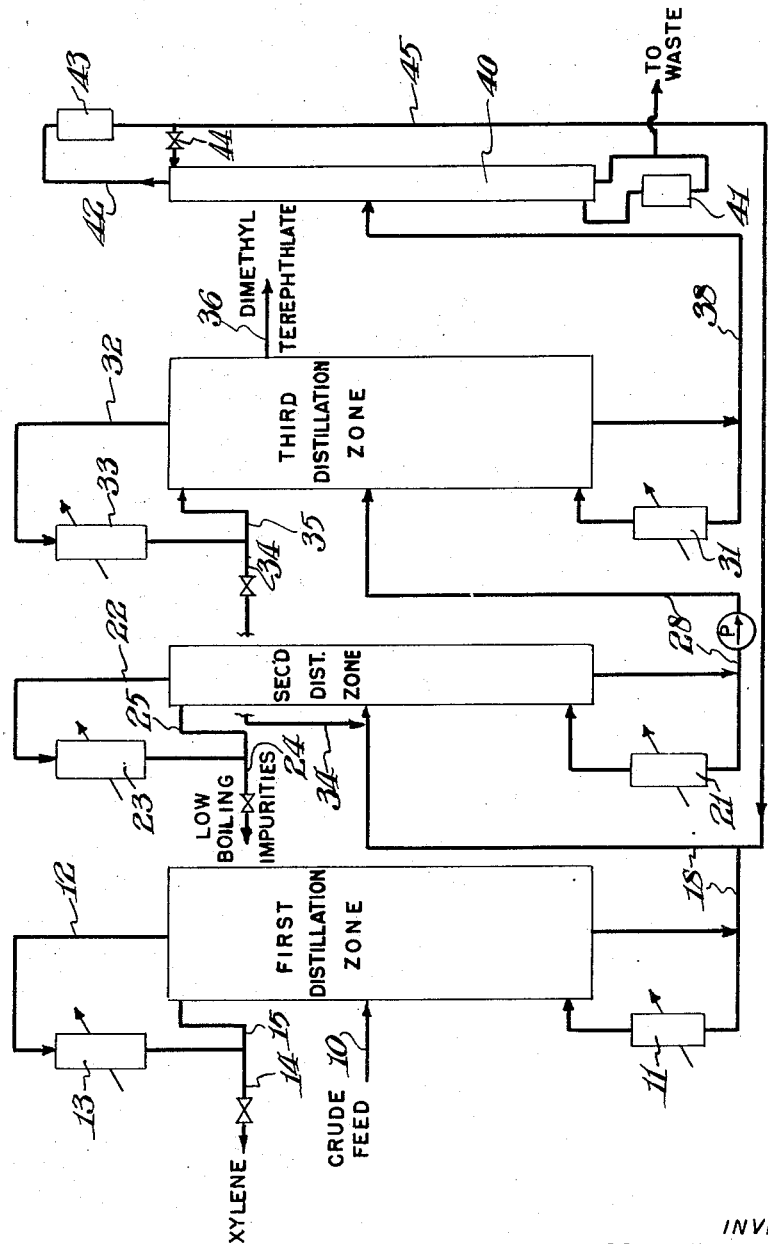

2,646,393

UNITED STATES PATENT OFFICE

2,646,393

PROCESS FOR THE PURIFICATION OF DIMETHYL TEREPHTHALATE BY DISTILLATION

Jesse Edward Hughes, Bridgeport, N. J., Harold Steen Kemp, Elsmere, and Cyrus Pyle, New Castle, Del., assignors to E. I. du Pont de Nemours & Company, Wilmington, Del., a corporation of Delaware Application June 21, 1952, Serial No. 294,824

3 Claims. (Cl. 202—40)

This invention relates to an improved distillation process, and particularly to a process for the distillation purification of dimethyl terephthalate.

Dimethyl terephthalate, $C_6H_4(COOCH_3)_2$, is manufactured by the catalytic reaction of methanol with terephthalic acid. The catalyst and the bulk of the other contaminants are removed from the crude ester by a water wash and successive crystallizations from xylene to yield a product contaminated with xylene, methyl benzoate, methyl hydrogen terephthalate, and small amounts of other impurities. In the recrystallized and washed product the solvent xylene has the lowest boiling point, the methyl hydrogen terephthalate has the highest boiling point and dimethyl terephthalate boils at an intermediate temperature. The other impurities, hereinafter bulked together as a class under the title "low-boiling impurities," comprises primarily methyl benzoate, small amounts of tolualdehydes and methyl p-toluate, and other low boilers not identified, all of which are more volatile than dimethyl terephthalate. For certain uses, such as artificial fiber manufacture, it is necessary to employ dimethyl terephthalate of high purity and it is the principal object of this invention to provide a distillation process for the purification of the recrystallized dimethyl terephthalate product obtained as hereinabove described. Another object is the provision of a continuous process for the distillation purification of dimethyl terephthalate. Other objects of this invention will become apparent from the detailed description and the diagrammatic drawing illustrating a preferred arrangement of equipment for carrying out one embodiment of the inventive process.

The process of this invention comprises purifying semi-refined dimethyl terephthalate by distillation within three separate distillation zones in sequence, the first and second of which may comprise either packed or plate-type columns, while the third zone is a plate-type column.

Referring to the drawing, the feed is introduced continuously through line 10 to the first distillation zone which is provided with calandria 11, indirectly heated by steam or a high-boiling heat exchange liquid, such as diphenyl, diphenyl oxide or the like. Overhead vapors from the first distillation zone, consisting primarily of xylene, are withdrawn through line 12 and condensed in indirectly cooled water condenser 13, the major portion of the condensate being withdrawn from the system through valved line 14, although a portion is returned as reflux to the first distillation zone through line 15.

The bottom product from the first distillation zone is removed continuously through line 18 discharging into a second distillation zone, which is provided with a calandria 21 and a condenser 23, similar to calandria 11 and condenser 13 of the first distillation zone. Overhead vapors from the second distillation zone withdrawn through line 22 comprise a dimethyl terephthalate fraction including any xylene not removed in the first distillation zone and the major portion of the low-boiling impurities contained in the feed and formed during the distillation. A minor portion of the condensate from 23 is removed from the system through valved line 24, while a major portion is returned to the second distillation zone as reflux through line 25.

The bottom product from the second distillation zone is removed continuously through line 28 discharging into a third distillation zone, a plate-type column, which is provided with a calandria 31, similar to calandrias 11 and 21, and a condenser 33.

The overhead vapors leaving the third distillation zone through line 32 contain a considerable amount of heat, which can be recovered in indirect-cooled condenser 33 by the vaporization of the water coolant with the production of process steam for general plant use at a pressure level of approximately 75 lbs./sq. in. gage. The overhead product from the third distillation zone consists of dimethyl terephthalate contaminated with low-boiling impurities not removed in the second distillation zone and formed in the third distillation zone and the bulk of the resulting condensate is returned to the third distillation zone as reflux through line 35. A portion is preferably continuously returned to the second distillation zone for reprocessing therein through valved line 34 connected with line 18. High-purity dimethyl terephthalate product is recovered from the third distillation zone through line 36 opening at a plate intermediate the entrance of line 28 to this zone and overhead line 32.

The bottom product leaving the third distillation zone through line 38 comprises a dimethyl terephthalate fraction containing substantially all of the methyl hydrogen terephthalate present in the crude material fed to the process, plus that formed in the distillation train. Although not required for the successful conduct of the process of this invention, it is economically desirable to recover at least a portion of the dimethyl terephthalate removed as bottoms and this can be conveniently accomplished by subjecting this fraction to a separate distillation in heels recovery column 40, which may be of the packed type. Column 40 is provided with calandria 41, similar to calandrias 11, 21 and 31, and an indirect water-cooled condenser 43 receiving vaporous overhead discharged through line 42. A portion of the condensate from 43 is supplied to column 40 as reflux through valved line 44, while the remainder is recycled through the purification process by line 45 connected to line 18.

In a typical installation, xylene was removed in a first distillation zone consisting of a packed column; however, for larger installations bubble cap columns are preferred. The flow rates, compositions of feed, distillate, and bottoms, and operating temperatures and pressures maintained in the first distillation zone were as follows:

|  | Feed | Distillate | Bottoms |
|---|---|---|---|
| Flow rate, lb./hr | 44.1 | 16.5 (of which 5.5 lbs. was returned as reflux and 11.0 lbs. was withdrawn from the system). | 33.1 lbs. passed to second distillation zone. |
| Temperature, °C | 145 | 145 | 285. |
| Column press. at point of supply or withdrawal, mm. Hg abs. | 795 | 760 | 840. |
| Composition (wt. percent): |  |  |  |
| Xylene | 25.0 | 100 | 0. |
| Low-boiling impurities | 0.80 | 0 | 0.601. |
| Dimethyl terephthalate | 73.83 | 0 | 99.12. |
| Methyl hydrogen terephthalate | 0.37 | 0 | 0.279. |

(The above-reported data was obtained in apparatus employing a still-pot in place of a calandria.)

A column packed with $3/8$ in. Raschig rings was employed as the second distillation zone and the following flow rates, compositions of feed, distillate and bottoms, and operating temperatures and pressures existed therein, the feed stream values reported being those for material derived from the first and third distillation zones only, exclusive of material returned for reprocessing from heels recovery column 40 through line 45:

|  | Feed | Distillate | Bottoms |
|---|---|---|---|
| Flow rate, lb./hr | 40.1 (see note infra). | 12.72 (of which 10.6 lbs. was returned as reflux and 2.12 lbs. was withdrawn from the system). | 37.98 |
| Temperature, °C | 260 | 270 | 288 |
| Column pressure at point of supply or withdrawal, mm. Hg abs. |  | 760 | 767 |
| Composition (wt. percent): |  |  |  |
| Xylene | 0 | 0 | 0 |
| Low-boiling impurities | 1.55 | 6.39 | 1.3 |
| Dimethyl terephthalate | 98.21 | 93.61 | 98.46 |
| Methyl hydrogen terephthalate | 0.242 | 0 | 0.24 |

(The above-reported data was obtained in apparatus employing a still-pot in place of a calandria.)

NOTE.—The feed comprised material from the first distillation zone (33.1 lb./hr.) and from condenser 33 (7 lb./hr.), a total of 40.1 lb./hr., the compositions in weight percent being as follows:

| Composition | Material from First Distillation Zone (33.1 lb./hr.) | Material from Condenser 33 (7 lb./hr.) | Total (40.1 lb./hr.) |
|---|---|---|---|
| Xylene | 0 | 0 | 0 |
| Low-boiling impurities | 0.601 | 6.04 | 1.55 |
| Dimethyl terephthalate | 99.12 | 93.89 | 98.21 |
| Methyl hydrogen terephthalate | 0.279 | 0.07 | 0.242 |

A stainless steel sieve plate column provided with 25 plates having holes of $1/8''$ diam. spaced on $3/8''$ equilateral triangular centers was employed for the third distillation zone, feed being introduced on the ninth plate from the bottom and product dimethyl terephthalate being withdrawn from the nineteenth plate from the bottom. The flow rates, compositions of feed, product, distillate, and bottoms, and operating temperatures and pressures maintained for this zone were as follows:

|  | Feed | Product Cut | Distillate | Bottoms |
|---|---|---|---|---|
| Flow rate, lb./hr | 37.98 | 28.2 | 84 (of which 77 lbs. was returned as reflux and 7 lbs. was recycled to the second distillation zone thru line 34). | 2.78 |
| Temperature, °C | 260 | 288 | 287 | 296 |
| Column pressure at point of supply or withdrawal, mm. Hg abs. | 860 (estimated) | 807 (estimated) | 760 | 891 |
| Composition (wt. percent): |  |  |  |  |
| Xylene | 0 | 0 | 0 | 0 |
| Low-boiling impurities | 1.3 | 0.08 | 6.04 | 0 |
| Dimethyl terephthalate | 98.46 | 99.90 | 93.89 | 97.20 |
| Methyl hydrogen terephthalate | 0.24 | 0.02 | 0.07 | 2.8 |

(The above-reported data was obtained in apparatus employing a still-pot in place of a calandria.)

A final distillation treatment of 100 lbs. of accumulated bottoms product from the third distillation zone in a heels recovery column packed with $1''$ Raschig rings yielded fractions of the following compositions, the distillate fraction being returned to the second distillation zone for reprocessing through line 45, while the bottoms fraction was discarded to waste:

|  | Distillate | Bottoms |
|---|---|---|
| Yield, lbs | 60.95 | 39.05 |
| Composition (wt. percent): |  |  |
| Xylene | None | None |
| Low-boiling impurities | None | None |
| Dimethyl terephthalate | 99.91 | 90.72 |
| Methyl hydrogen terephthalate | 0.09 | 9.28 |

(The above-reported data was obtained in apparatus employing a still-pot in place of a calandria.)

From the foregoing it will be seen that the process of this invention is operative continuously and produces a dimethyl terephthalate product of exceedingly high purity. Numerous modifications within the spirit of the invention will occur to persons skilled in the art, wherefor it is desired to be limited only by the scope of the following claims.

What is claimed is:

1. A continuous process for the distillation purification of dimethyl terephthalate contaminated with xylene, methyl hydrogen terephthalate and low-boiling impurities, including methyl benzoate and other low boilers, comprising introducing the impure material into a first distillation zone, distilling said impure material in said first distillation zone and removing substantially all of said xylene as a first vaporous overhead product, condensing said first vaporous overhead product and returning a portion thereof to said first distillation zone as reflux, withdrawing a first bottom product from said first distillation zone and introducing said first bottom product into a second distillation zone, distilling said first bottom product in said second distillation zone and removing a substantial amount of said low-boiling impurities together with remaining xylene as a second vaporous overhead product from said second distillation zone, condensing said second vaporous overhead product and returning a portion thereof as reflux to said second distillation zone, withdrawing a second bottom product from said second distillation zone and introducing said second bottom product into a third distillation zone consisting of a plate type column, distilling said second bottom product in said third distillation zone and removing substantially all of the remainder of said low boiling impurities as a third vaporous overhead product, condensing said third vaporous overhead product and returning a portion thereof as reflux to said third distillation zone, withdrawing as a third bottom product from said third distillation zone a mixture containing substantially all of said methyl hydrogen terephthalate both introduced and produced and some dimethyl terephthalate, and withdrawing as a liquid side cut from a point intermediate the point of introduction of said second bottom product into said third distillation zone and the point of withdrawal of said third vaporous overhead product from said third distillation zone substantially pure dimethyl terephthalate.

2. A continuous process for the distillation purification of dimethyl terephthalate according to claim 1 wherein the third distillation zone comprises a sieve-plate column.

3. A continuous process for the distillation purification of dimethyl terephthalate according to claim 1 wherein a portion of the condensed overhead product from said third distillation zone is recycled as feed to said second distillation zone.

JESSE EDWARD HUGHES.
HAROLD STEEN KEMP.
CYRUS PYLE.

References Cited in the file of this patent

UNITED STATES PATENTS

| Number | Name | Date |
|---|---|---|
| 2,459,014 | Cavanaugh et al. | Jan. 11, 1949 |
| 2,491,660 | Gresham | Dec. 20, 1949 |